United States Patent [19]

Strong

[11] 4,109,771

[45] Aug. 29, 1978

[54] SAFETY LOCKOUT FOR ENGINE CLUTCH

[75] Inventor: Richard I. Strong, Green Bay, Wis.

[73] Assignee: Northwest Engineering Company, Green Bay, Wis.

[21] Appl. No.: 804,637

[22] Filed: Jun. 8, 1977

[51] Int. Cl.² ............................................. F16D 25/00
[52] U.S. Cl. ........................................ 192/83; 192/86
[58] Field of Search .................................... 192/83, 86

[56] References Cited

U.S. PATENT DOCUMENTS

| 2,603,327 | 7/1952 | King ......................................... 192/86 |
| 2,959,260 | 11/1960 | Johnson et al. ........................... 192/83 |
| 3,395,783 | 8/1968 | Allin ......................................... 192/83 |

FOREIGN PATENT DOCUMENTS 240,458  8/1962  Australia ................................... 192/83

Primary Examiner—Benjamin W. Wyche
Attorney, Agent, or Firm—Andrus, Sceales, Starke & Sawall

[57] ABSTRACT

Pneumatic actuation of an over-center clutch by a main control valve and fluid motor in the direction to engage the clutch is prevented by one or more safety lockout control valves each diverting the pneumatic pressure fluid from the main control valve to actuate the fluid motor in the direction of clutch disengagement while connecting the main control valve to drain. A single operative fluid pressure is employed.

4 Claims, 1 Drawing Figure

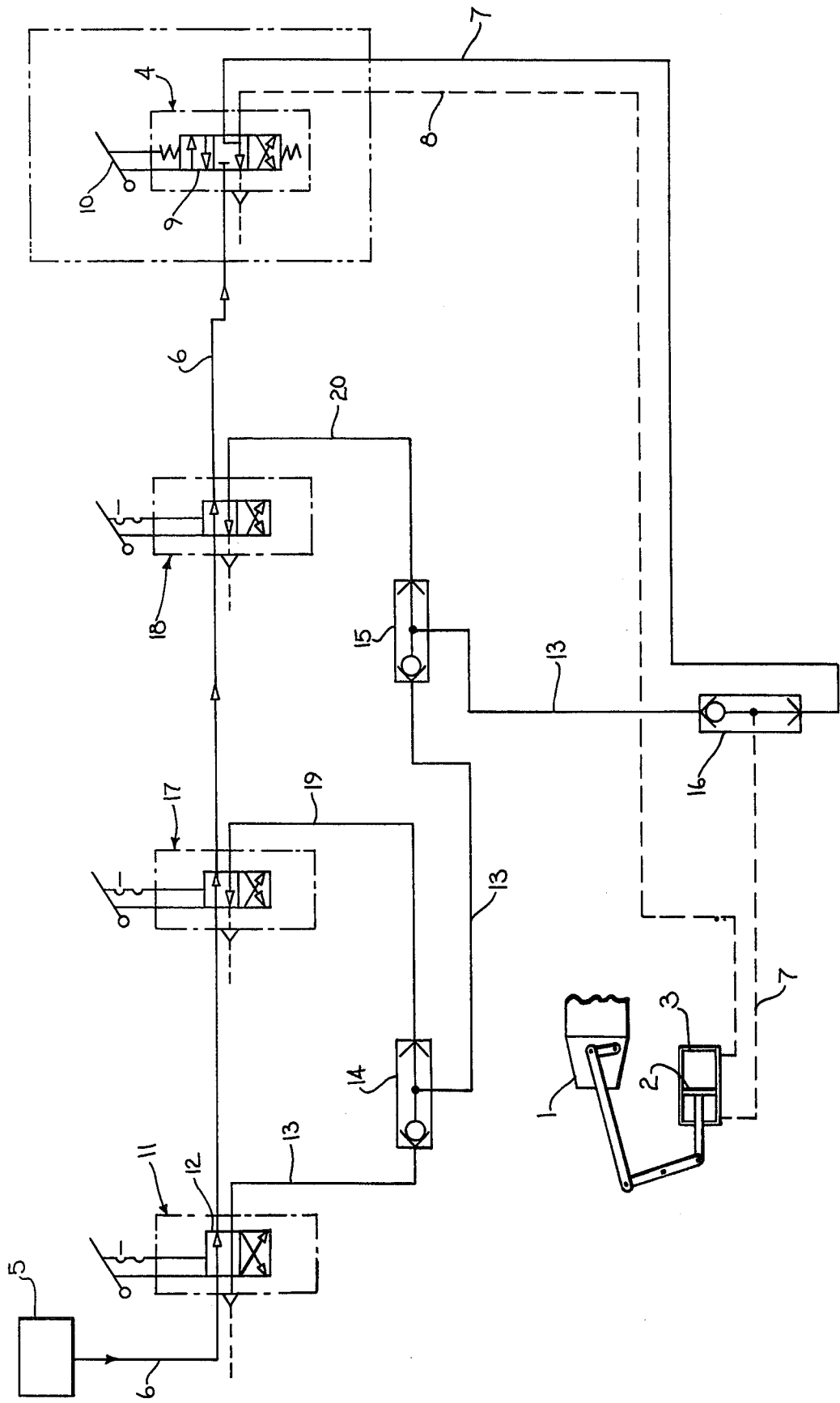

SAFETY LOCKOUT FOR ENGINE CLUTCH

Background of the Invention

This invention relates to safety apparatus designed specifically for the protection of maintenance men working on machines such as power shovels and cranes in positions remote from the cab where they cannot be seen by the operator.

The objective is to provide an individual safety lockout at one or more maintenance locations operable by the maintenance man to prevent the operator in the cab from starting the machine and possibly injuring the maintenance man.

A reasonably recent apparatus of this type that has been employed commercially is illustrated in U.S. Pat. No. 3,395,783 issued to George S. Allin, Jr. on Aug. 6, 1968. The apparatus there disclosed employs two different fluid pressures and generally depends upon a pressure differential to assure actuation of the fluid motor in the desired direction of clutch disengagement.

Furthermore, the requirement of a pressure regulating valve to obtain the two different operating pressures adds cost and can present a maintenance problem.

Summary of the Invention

The present invention employs only a single fluid pressure with a lockout valve at each maintenance location operating through suitable shuttle valves to actuate the fluid control motor in a direction of clutch disengagement and at the same time disconnect the main control valve in the cab from the source of fluid pressure so that it becomes inoperable.

The apparatus has been simplified to comprise generally the source of fluid pressure, the fluid motor for actuating the clutch, a main control valve operable from the cab to direct fluid from the source to the motor to actuate the latter either in a direction to engage the clutch or in a direction to disengage the clutch. One or more lockout valves are employed in the supply line from the source to the main control valve and which may selectively divert pressure fluid from the supply line through one or more suitable shuttle valves to the fluid motor to actuate the latter in the direction of clutch disengagement, and also which may interrupt the flow of fluid from the source to the main control valve whereby the latter becomes inoperable during actuation of any lockout valve.

Brief Description of the Drawing

The single FIGURE of the accompanying drawing schematically illustrates the pneumatic system of the invention in the best mode presently contemplated.

Description of the Preferred Embodiment

Referring to the drawing, the over-center toggle actuated engine clutch 1 is moved to its engaged or disengaged position by the double acting piston 2 operable in power cylinder 3 and connected to the clutch through suitable lever arms and linkage well known in the art.

Power fluid is supplied selectively to opposite ends of cylinder 3 through a primary operator's control valve 4 from a source 5 of air at substantially constant pressure. For this purpose conduit 6 leads from source 5 to valve 4 and conduits 7 and 8 lead from valve 4 to the respective opposite ends of cylinder 3.

The main control valve 4 is located in the cab and is preferably a three position spring centered slide valve. In the center position the valve slide 9 connects both conduits 7 and 8 to exhaust as indicated.

When the slide 9 of valve 4 is moved down to its lower position by lever arm 10, it connects supply conduit 6 directly to conduit 7 which then pressurizes the left hand end of cylinder 3, moving piston 2 to the right and disengaging the clutch 1. At the same time slide 9 connects conduit 8 to exhaust to depressurize the right hand end of cylinder 3.

When the slide 9 is moved to its uppermost position it connects the supply conduit 6 directly to conduit 8 which then pressurizes the right hand end of cylinder 3, moving the piston 2 to the left and engaging the clutch 1. At the same time slide 9 connects conduit 7 to exhaust to depressurize the left hand end of cylinder 3.

A secondary maintenance engine clutch lockout control valve 11 is provided at each maintenance area on the machine for the purpose of preventing start up or operation of the machine while a maintenance man may be at any one of the areas.

The valves 11 are two-position four-way valves with the slide 12 latched in either position.

When slide 12 is in its lower position as shown, it connects the two ends of conduit 6 through the valve, and when the slide is in its upper position it completely interrupts the conduit 6 and connects that portion of conduit 6 coming from source 5 with conduit 13 leading through shuttle valves 14, 15 and 16 to conduit 7 to pressurize the left hand end of cylinder 3 and make sure that the clutch 1 is disengaged, and at the same time connects the opposite portion of conduit 6 to exhaust.

Conduit 13 is connected to exhaust when the slide 12 is in its lower position.

There may be any suitable number of lockout valves, the drawing showing two additional valves 17 and 18.

Each additional valve 17 and 18 is connected in conduit 6 the same as described above for valve 11 and the conduits 19 and 20 leading from the respective additional valves 17 and 18 connect with conduit 13 through the corresponding shuttle valves 14 and 15 respectively.

The construction and operation of lockout valves 17 and 18 is the same as that described for valve 11.

Shuttle valve 14 has a movable ball or plunger which closes conduit 19 going to exhaust through valve 17 to thereby pressurize conduit 13. The same is true of shuttle valve 15 which closes conduit 20 leading to exhaust through valve 18. Shuttle valve 16 is of the same construction and serves to prevent escape of pressure from conduit 13 to that part of conduit 7 leading to exhaust through control valve 4.

In operation when the maintenance man actuates lockout valve 11 the air flows through conduit 13 to shuttle valve 14 and moves the ball or plunger of that valve toward the end connected to conduit 19 preventing escape of the air into valve and possible exhaust.

The air then flows through valve 14 along conduit 13 to the next shuttle valve 15 where it likewise forces the ball or plunger over to close conduit 20 and prevent the air from escaping through valve 18 to exhaust.

The air then continues through valve 15 and conduit 13 to shuttle valve 16 where it forces the ball or plunger of that valve to close the portion of conduit 7 leading to valve 4 and exhaust. At the same time valve 16 connects conduit 13 to that portion of conduit 7 leading to cylinder 3 to pressurize the left hand end of the cylinder as previously described.

When the maintenance man completes his work and leaves the area of lockout valve 11 he unlatches the valve and the slide returns to normal which is the position shown in the drawing and previously described.

If the maintenance man then goes to the area of lockout valve 17 he immediately moves the slide of that valve upwardly to connect the incoming supply line to conduit 19 and connect the outgoing supply line to exhaust. Air will then flow down conduit 19 to shuttle valve 14 where it pushes the ball or plunger to close the incoming line 13 and connects conduit 19 to the outgoing part of line 13, letting the air flow through shuttle valves 15 and 16 and conduit 7, thence to the left hand end of cylinder 3.

The valve 17 is then latched in that position until the maintenance man is through and leaves the area, when he unlatches the valve and lets it return to normal position.

If he next goes to the area of lockout valve 18 he actuates the valve to lift the slide to its upper position and latches the same.

In this upper position of the slide for lockout valve 18 the air flows from incoming supply line 6 through valve 18, conduit 20 to shuttle valve 15, and from thence through a portion of conduit 13 to shuttle valve 16, and a portion of conduit 7 to the left hand end of cylinder 3.

When all lockout valves are in normal position the shuttle valve 16 serves to close conduit 13 in response to fluid pressure in line 7 from control valve 4, thereby preventing exhaust of pressure through any of the lockout valves.

The shuttle valves 14 and 15 serve to isolate the several lockout valves from each other, and shuttle valve 16 serves to isolate control valve from the system when a lockout valve is actuated and to isolate the lockout valves when all of them are in normal inoperative position and the control valve is actuated.

If two maintenance men are working in different areas at the same time, whichever man actuates his lockout valve first will control the disengagement of the clutch. However, the second maintenance man should in that event actuate and latch his lockout valve also, so that the clutch will remain positively disengaged when the first maintenance man completes his work and returns his lockout valve to normal.

In the event the operator in the cab attempts to actuate the machine by moving valve 4 to the position of clutch position, there will be no air supply through the latched lockout valve to valve 4 and consequently no power to actuate the piston toward clutch engagement.

The apparatus thus provided is of simple construction and provides the needed safety without danger of failure.

Various modes of carrying out the invention are contemplated as being within the scope of the following claims particularly pointing out and distinctly claiming the subject matter which is regarded as the invention.

I claim:

1. In combination with a mechanical drive clutch of the over-center type actuated by a double acting pneumatic piston-cylinder means supplied with pneumatic pressure from a source of such pressure through a main control valve selectively pressurizing either end of the cylinder, a remote safety lockout valve connected in the supply line from the source to the main control valve to provide for selective interruption of the pneumatic pressure to said main control valve, conduit means from said lockout valve to supply pneumatic pressure to the end of the power cylinder actuating the piston therein in a direction to disengage the clutch during said interruption of pneumatic pressure to said main control valve, means assuring exhaust of pneumatic pressure from the opposite end of the power cylinder during said selective actuation of said lockout valve, and means responsive to the pneumatic pressure from said lockout valve to prevent exhaust of pneumatic pressure through said control valve from said first named cylinder end.

2. The combination of claim 1 in which said last named means comprises a shuttle valve having a plunger alternatively movable to close either said conduit in response to pneumatic pressure from said control valve or to close the line from said control valve in response to pneumatic pressure from said conduit and in either instance to pass pneumatic pressure to the first named end of the cylinder to assure disengagement of the clutch.

3. The combination of claim 2 and a second lookout valve connected to selectively interrupt the pneumatic pressure from the source to the control valve, conduit means from said second lockout valve to said first conduit to supply pneumatic pressure to said first named cylinder end when said second lockout valve is selectively actuated, and a shuttle valve at the juncture between said conduits to alternatively close either of said conduits leading from the corresponding lockout valves when the other conduit is pressurized.

4. The combination of claim 1 in which a plurality of like lockout valves are employed with the pressure fluid output of each interconnected through shuttle valve means to isolate the actuation of any valve from the other valve or valves.

* * * * *

UNITED STATES PATENT AND TRADEMARK OFFICE
CERTIFICATE OF CORRECTION

PATENT NO. : 4,109,771
DATED : August 29, 1978
INVENTOR(S) : Richard I. Strong

It is certified that error appears in the above-identified patent and that said Letters Patent are hereby corrected as shown below:

Column 3, Line 50, After "clutch" insert ---engagement while one of the lockout valves is latched to lockout---

Signed and Sealed this

Thirteenth Day of March 1979

[SEAL]

Attest:

RUTH C. MASON
Attesting Officer

DONALD W. BANNER
Commissioner of Patents and Trademarks